United States Patent
Honkomp et al.

(10) Patent No.: US 12,328,033 B2
(45) Date of Patent: Jun. 10, 2025

(54) METHOD FOR CHECKING A MODEL TEMPERATURE OF AN ELECTRICAL MACHINE ASCERTAINED BY MEANS OF A TEMPERATURE MODEL, AND MOTOR VEHICLE

(71) Applicant: AUDI AG, Ingolstadt (DE)

(72) Inventors: Franz Honkomp, Ingolstadt (DE); Thomas Heckel, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 712 days.

(21) Appl. No.: 17/527,602

(22) Filed: Nov. 16, 2021

(65) Prior Publication Data

US 2022/0239169 A1    Jul. 28, 2022

(30) Foreign Application Priority Data

Jan. 27, 2021   (DE) .......................... 102021101813.7

(51) Int. Cl.
*H02K 1/20* (2006.01)
*H02K 1/32* (2006.01)
(Continued)

(52) U.S. Cl.
CPC ............... *H02K 1/20* (2013.01); *H02K 1/32* (2013.01); *H02K 3/24* (2013.01); *H02K 9/19* (2013.01)

(58) Field of Classification Search
CPC .......... B60L 2240/425; B60L 2250/10; B60L 3/0038; B60L 3/0061; B60L 3/12;
(Continued)

(56) References Cited

U.S. PATENT DOCUMENTS 4,879,497 A    11/1989  Meyer et al.
5,097,193 A *   3/1992  Neis .......................... H02P 5/46
                                                                318/800
(Continued)

FOREIGN PATENT DOCUMENTS

DE    3736303 T2    5/1989
DE    10212751 A1   10/2003
(Continued)

OTHER PUBLICATIONS

German Search Report issued on Jun. 30, 2021 in corresponding German Application No. 102021101813.7; 8 pages; Machine translation attached.

*Primary Examiner* — Alex W Mok
(74) *Attorney, Agent, or Firm* — Maier & Maier, PLLC

(57) ABSTRACT

A method for checking a model temperature of an electrical machine ascertained by a temperature model. At least one manipulated variable relating to the electrical machine is specified by a regulation of the electrical machine as a function of a setpoint variable. A model value of the manipulated variable is ascertained as a function of the manipulated variable and the model temperature from a machine model comprising at least one temperature-dependent parameter. A difference between the actual manipulated variable of the regulation and the model value of the manipulated variable and/or a difference between a variable derived from the actual manipulated variable of the regulation and a corresponding further variable derived from the model value of the manipulated variable is ascertained. The difference is compared to a limiting value and, if the limiting value is exceeded, a deviation of the model temperature from an actual temperature of the electrical machine is detected.

13 Claims, 3 Drawing Sheets

(51) Int. Cl.
*H02K 3/24* (2006.01)
*H02K 9/19* (2006.01)

(58) Field of Classification Search
CPC .. H02K 1/20; H02K 1/32; H02K 3/24; H02K 9/19; H02P 23/14; H02P 29/60; H02P 6/34
USPC .......................................................... 310/52
See application file for complete search history.

(56) References Cited

U.S. PATENT DOCUMENTS

| | | | | |
|---|---|---|---|---|
| 7,099,793 | B2 * | 8/2006 | Rechberger | H02P 9/006 |
| | | | | 702/130 |
| 7,256,563 | B2 * | 8/2007 | Kuehner | H02P 21/22 |
| | | | | 318/432 |
| 7,340,968 | B2 | 3/2008 | Schneider et al. | |
| 7,423,406 | B2 * | 9/2008 | Geniusz | H02P 23/07 |
| | | | | 318/609 |
| 7,590,477 | B2 * | 9/2009 | Loeffler | B60W 10/08 |
| | | | | 701/53 |
| 8,084,984 | B2 | 12/2011 | Lu et al. | |
| 8,487,575 | B2 | 7/2013 | Yeh et al. | |
| 9,048,773 | B2 * | 6/2015 | Margner | H02P 29/64 |
| 9,166,518 | B2 * | 10/2015 | Campbell | H02P 29/66 |
| 9,614,472 | B2 | 4/2017 | Dooley | |
| 9,625,400 | B2 * | 4/2017 | Schneider | G05D 23/24 |
| 9,716,450 | B2 * | 7/2017 | Vollmer | H02P 21/14 |
| 9,835,349 | B2 * | 12/2017 | Salsbury | F24F 11/46 |
| 10,826,420 | B2 * | 11/2020 | Hoffmann | H02P 23/14 |
| 2004/0257011 | A1 * | 12/2004 | Rechberger | H02P 9/00 |
| | | | | 318/139 |
| 2013/0327124 | A1 * | 12/2013 | Schneider | G05D 23/24 |
| | | | | 73/25.01 |
| 2014/0353979 | A1 * | 12/2014 | Magini | F02N 11/08 |
| | | | | 290/38 C |
| 2016/0111986 | A1 * | 4/2016 | Vollmer | H02P 21/14 |
| | | | | 318/400.23 |
| 2018/0198391 | A1 * | 7/2018 | Stichweh | H02P 6/22 |
| 2019/0341831 | A1 * | 11/2019 | Winkelmeyr | H02K 9/197 |

FOREIGN PATENT DOCUMENTS

| | | |
|---|---|---|
| DE | 102009025390 A1 | 1/2010 |
| DE | 102010038560 A1 | 4/2011 |
| DE | 102014200337 A1 | 7/2015 |
| DE | 102014016452 B4 | 5/2016 |
| DE | 202016101853 U1 | 6/2016 |
| EP | 1180671 A1 | 2/2002 |

* cited by examiner

METHOD FOR CHECKING A MODEL TEMPERATURE OF AN ELECTRICAL MACHINE ASCERTAINED BY MEANS OF A TEMPERATURE MODEL, AND MOTOR VEHICLE

FIELD

The invention relates to a method for checking a model temperature of an electrical machine ascertained by means of a temperature model, wherein at least one manipulated variable relating to the electrical machine is specified by a regulation of the electrical machine as a function of a setpoint variable. The invention furthermore relates to a motor vehicle.

BACKGROUND

In the case of electrical machines, a temperature inside the electrical machine, for example a temperature of an energized stator winding of the electrical machine, can be determined by means of a temperature sensor. However, such a temperature sensor increases the effort and costs in the production of the electrical machine. Furthermore, in the case of electrical machines used as traction machines in motor vehicles, for example, high reliability of the temperature determination can be required, so that the failure rate of a temperature sensor used is also to be taken into consideration. There is therefore an interest in methods, using which a temperature of the electrical machine can be ascertained without using a temperature sensor. Various approaches are known for this purpose from the prior art.

U.S. Pat. No. 9,614,472 B2 describes a system for determining a temperature inside an electrical machine. The temperature of a winding of the electrical machine is determined by measuring its temperature-dependent resistance.

EP 1180671 A1 describes a brushless alternating current generator which comprises a temperature measuring unit for ascertaining the temperature of a field winding. The temperature ascertainment unit ascertains a temperature of the field winding from a winding voltage and a current fed into the winding.

A method for energizing stator windings of a motor-operated induction machine is known from DE 10 2014 200 337 A1. The phase currents fed into the stator windings are partially subjected to bias currents, which are set by means of a vector-based method in such a way that they do not generate any torque in the electrical machine. The direct current generated thereby and superimposed on the phase currents is then used to ascertain the temperature of the stator winding via its resistance.

U.S. Pat. No. 8,084,984 B2 also relates to a system for measuring and controlling a stator winding temperature in an alternating current machine, wherein the temperature detection is determined via the resistance of the winding by means of a direct current.

DE 20 2016 101 853 U1 describes an electronic circuit for detecting the current winding temperature of phase windings. One or more two-pole terminals having an impedance that is dependent on the temperature are connected in parallel to two winding connections of the phase winding of the electrical machine. By acquiring current responses in the motor supply lines, which are dependent on the temperature-dependent impedance, a temperature of the phase windings is ascertained.

DE 10 2010 038 560 A1 describes a temperature estimation for a stator winding of an electric motor. An angular velocity of the motor and a total power loss are determined for each phase of the motor. The temperatures of the stator windings are then estimated via a combined thermal impedance for this phase and a stator winding power loss component of the total power loss. The combined thermal impedance has a first thermal impedance between the stator winding and the stator core and a second thermal impedance between the stator core and the motor coolant.

In U.S. Pat. No. 7,340,968 B2, the temperature of a rotating magnet in an electrical machine is determined by measuring the temperature-dependent electromotive force.

In DE 3 736 303 T2, the measurement of a temperature of a brushless direct current motor is also carried out by means of an integral of the electromotive force in a non-energized winding.

A method for ascertaining a stator winding temperature of an electrical machine is known from DE 10 2014 016 452 B4. The magnetic flux inside the electrical machine is determined when the electrical machine is idling. In the event of an active short circuit in the electrical machine, the temperature of the stator winding is ascertained from the flux and the flowing short circuit current. This temperature is then used as the starting temperature for a temperature model of the electrical machine, via which the temperature of the electrical machine can be calculated at different operating points.

In addition to ascertaining the temperature of the electrical machine via the measurement of temperature-dependent variables in the electrical machine, a temperature determination by means of a temperature model of the electrical machine is also possible. Using the temperature model, a model temperature of the electrical machine can be ascertained during operation of the electrical machine. In order to obtain a model temperature that corresponds as precisely as possible to the actual temperature of the electrical machine, it is very important that the model assumptions for the temperature model are correct. It is desirable here if a check of the model assumptions or the model temperature ascertained on the basis thereof is possible with as little effort as possible and in particular without the use of temperature sensors.

SUMMARY

The invention is therefore based on the object of specifying an improved method for checking a model temperature of an electrical machine ascertained by means of a temperature model, which method is in particular implementable with little effort.

To achieve this object, in a method of the type mentioned at the outset, it is provided according to the invention that a model value of the manipulated variable is ascertained as a function of the setpoint variable and the model temperature from a machine model comprising at least one temperature-dependent parameter, wherein a difference between the actual manipulated variable of the regulation and the model value of the manipulated variable and/or a difference between a variable derived from the actual manipulated variable of the regulator and a corresponding further variable derived from the model value of the manipulated variable is ascertained, wherein the difference is compared to a limiting value and, if the limiting value is exceeded, a deviation of the model temperature from an actual temperature of the electrical machine is detected.

The regulation of the electric machine generates a manipulated variable as a function of a predefined setpoint variable, which acts on the electric machine in order to set a controlled variable according to the predefined setpoint variable. By means of the regulation, disturbances acting on the electrical machine can advantageously be compensated for without a specific measurement of the respective disturbance variable being necessary. In this way, temperature-dependent effects can also be taken into consideration in the regulation of the electrical machine, which are included in the manipulated variable ascertained by the regulation. The manipulated variable ascertained by the regulation therefore at least partially depends on the temperature of the electrical machine or on the temperature of a component of the electrical machine on which the manipulated variable acts.

In addition to the actual manipulated variable that is generated by the regulation, a model value of the manipulated variable is also ascertained according to the invention using the machine model comprising at least one temperature-dependent parameter. The model temperature to be checked, which was determined via the temperature model, is used as the temperature for the machine model. The model value of the manipulated variable determined by means of the machine model corresponds to the value of the actual manipulated variable if the model temperature entered in the machine model by the at least one temperature-dependent parameter corresponds to the actual temperature of the electrical machine.

This means that if the model temperature deviates from the actual temperature of the electrical machine, a deviation of the model value of the manipulated variable from the actual manipulated variable occurs. This deviation is ascertained in that a difference is formed from the actual manipulated variable of the regulation and the model value of the manipulated variable, wherein the difference is compared to a limiting value. If the limiting value is exceeded, a deviation of the model temperature from the actual temperature of the electrical machine can be detected accordingly.

Additionally or alternatively thereto, it is possible to ascertain a derived further variable in each case from the actual manipulated variable and from the model value of the manipulated variable, wherein the difference between the further variable derived from the actual manipulated variable and the further variable derived from the model value of the manipulated variable is also compared to a limiting value in each case. Correspondingly, a deviation of the model temperature from the actual temperature can also be detected when this limiting value is exceeded.

A limiting value used for comparison to the difference between the actual manipulated variable and the model value of the manipulated variable can be equal to or different from the limiting value to which the difference from the further variables derived in each case is compared. The limiting values can each be zero or greater, wherein in particular an absolute value of the difference is compared to the associated limiting value. When checking the model temperature, the use of a limiting value greater than zero can advantageously compensate for further disturbance variables acting on the controlled system and/or effects not modeled in the machine model.

The machine model describes, in particular, a dependency of the manipulated variable on the setpoint variable, taking into consideration at least one temperature-dependent parameter of the electrical machine and can comprise at least one computing rule for this purpose. Further parameters, including those that are not temperature-dependent, can be included in the machine model if these are required for a determination or calculation of the model value of the manipulated variable from the setpoint variable. The type of the parameters and/or the at least one computing rule describing the dependency of the manipulated variable on the setpoint variable can depend on the type or design of the electrical machine and on the manipulated variable used and the setpoint variable used.

The model temperature to be checked is determined by means of a temperature model which, in particular on the basis of operating parameters of the electrical machine, calculates a temperature of the electrical machine on the basis of at least one computing rule. In particular, operating parameters which have a significant influence on the temperature of the electrical machine can be taken into consideration. These can be, for example, a stator current, a current in an excitation winding, a torque of the electrical machine, and/or a speed of the electrical machine. Furthermore, the operating time of the electrical machine or the power converted in each case in the electrical machine during the operating time can also be taken into consideration.

The temperature model can in particular also take into consideration or calculate the cooling performance of a cooling device connected to the electrical machine and/or determine heat flows from the electrical machine into the cooling device. For this purpose, for example, operating parameters of the cooling device, such as a cooling water temperature and/or a conveyed amount of coolant, can be taken into consideration. In this way, the temperature of the electrical machine can be ascertained as a model temperature as a function of its previous operating points and as a function of the operating points of the cooling system.

The method according to the invention has the advantage that no further sensors have to be used to ascertain the temperature in order to check the correctness of the model temperature. To ascertain the manipulated variable, it is sufficient to use the sensors that are already available to the regulation. In the case of an electrical machine operated via an inverter and a battery, this can be, for example, the voltage of a DC voltage intermediate circuit and/or the phase currents flowing in the electrical machine, which can be used, for example, in a current regulation. Parameters ascertained and/or stored in other ways can also advantageously be used for the machine model, so that advantageously no sensors have to be used to ascertain the model value of the manipulated variable.

The method advantageously enables that no further sensors, for example in a cooling system coupled to the electrical machine, have to be used to check the temperature model or the model temperature ascertained by means of the temperature model in order to detect incorrect model temperatures. The use of further temperature sensors and/or pressure sensors in the cooling system to check the function of the cooling system has the disadvantage that these sensors at least partially reduce the original cost advantage by eliminating a temperature sensor in the electrical machine and reintroduce error-prone sensors into the overall system.

By means of the method according to the invention, it is possible to check the model temperature ascertained by the temperature model, that is to say to check the correspondence of the ascertained model temperature with an actual temperature of the electrical machine. When a deviation of the model temperature from the actual temperature is established, for example, a control device designed to carry out the method can generate an item of error information which indicates the deviation, in particular an excessively high actual temperature of the electrical machine. This error information can be reported to a user of the electrical machine and/or transmitted to further control devices or within a motor vehicle comprising the electrical machine.

According to the invention, it can be provided that a setpoint current is used as the setpoint variable and/or that a control voltage is used as the manipulated variable. At least one control voltage, which acts on the electrical machine, can therefore be generated by the regulation as a function of a predefined setpoint current. The control voltage generates a current flow in the electrical machine in accordance with the predefined setpoint variable.

In one preferred embodiment of the invention, it can be provided that a manipulated variable is used which acts on a winding of the electrical machine, in particular a stator winding or a rotor winding of the electrical machine. The winding of the electrical machine can be a single-phase or a multiphase winding. The manipulated variable can in particular be a single-phase or multiphase control voltage which drops across the winding or the individual phases of the winding. The temperature of the winding, in particular the temperature of a stator winding and/or a rotor winding, can preferably be ascertained as the temperature of the electrical machine.

According to the invention, it can be provided that a phase voltage of the winding is used as a variable derived from the actual manipulated variable of the regulator and/or as a corresponding further variable derived from the model value of the manipulated variable. Depending on the type or design of the regulator, a phase voltage can be derived as a further variable from the manipulated variable generated by the regulation. This is possible in particular if a control voltage is used as the manipulated variable, which acts on a multiphase winding of the electrical machine and drops there as a phase voltage over each of the individual phases of the winding.

In one preferred embodiment of the invention, it can be provided that the regulation takes place by means of a field-oriented regulation and/or that at least one variable corresponding to the manipulated variable of the field-oriented regulation is determined by means of the machine model. For example, it is possible that the regulation ascertains the voltages $U_D$ and $U_Q$, which act on a multiphase winding of the electrical machine, as manipulated variables as a function of a setpoint current by means of a field-oriented regulation. The phase voltage in the multiphase winding can be ascertained from the manipulated variables $U_D$ and $U_Q$, so that the phase voltage can be used as a further variable derived from the manipulated variable.

Correspondingly, the phase voltage to be expected for the given model temperature can be ascertained by means of the machine model, also using the model temperature to be checked and the setpoint current. This can be implemented, for example, in that the machine model also determines model values for $U_D$ and $U_Q$, from which a model value of the phase voltage is accordingly derived as a corresponding variable. As described above, a difference between the phase voltage ascertained via the model and the phase voltage ascertained from the actual current variable of the regulation can then be formed and compared to a limiting value.

According to the invention, a model of a thermal network which comprises the electrical machine and at least one cooling device can be used as the temperature model. This advantageously enables the function of the cooling device also to be checked by checking the model temperature of the temperature model. Correct functioning of the cooling device is assumed within the temperature model, wherein the cooling capacity of the cooling device has a decisive influence on the temperature of the electrical machine. In the case of a model temperature which at least substantially corresponds to the actual temperature, the difference ascertained by means of the method according to the invention remains below the limiting value, so that correct functioning of the cooling device can be assumed. In a temperature model designed as a thermal network, in particular the generation of heat in the electrical machine and the heat flows into and out of the electrical machine, in particular into the cooling system, can be calculated and taken into consideration to ascertain the model temperature. As described at the outset, the operating parameters of the electrical machine and/or the cooling system can also be taken into consideration and included in the ascertainment of the model temperature.

Since a deviation of the actual temperature of the electrical machine from the model temperature of the electrical machine ascertained assuming the correct functioning of the cooling device can mean that the cooling device generates no or only a reduced cooling capacity, by determining the correctness of the ascertained model temperature of the electrical machine, it can also be concluded that the cooling device is functioning correctly. This advantageously makes it possible to also check the status of the entire cooling device. In this way, a fault in the cooling device, for example the failure of a non-diagnosable coolant pump and/or the clogging of a coolant inlet in the cooling device and/or the electrical machine, can advantageously be detected, since in such a case it can be assumed there is an increase in the actual temperature in relation to the model temperature.

According to the invention it can be provided that a winding resistance and/or a temperature-dependent magnetic flux is used as the temperature-dependent parameter of the machine model. Which or how many temperature-dependent parameters are used in the machine model can also be made dependent on the type and model of electrical machine, on the type of manipulated variable used or on the ascertainment of the model value of the manipulated variable, and/or on the respective, significantly temperature-dependent effects of the electrical machine.

In one preferred embodiment of the invention, it can be provided that the difference is only ascertained if the manipulated variable and/or the model value of the manipulated variable exceed a limiting value. This makes it possible that in an operating state of the electrical machine in which a manipulated variable with only a very small amplitude is present, no ascertainment of the difference is made if the small manipulated variable or the small model value of the manipulated variable has the effect that falling below the limiting value to be compared to the difference is not possible and/or is not meaningful. In particular, a separate limiting value can be used in each case for the manipulated variable and the model value of the manipulated variable. Furthermore, this limiting value assigned to the manipulated variable or the model value of the manipulated variable can be different from the limiting value which is compared to the difference between the manipulated variable and the model value of the manipulated variable and/or the difference between each of the further variables derived from these variables.

In one preferred embodiment of the invention, it can be provided that the manipulated variable of the regulation, the model value of the manipulated variable from the machine model, and the difference are continuously ascertained during the operation of the electrical machine at different times, wherein error information which describes a deviation of the model temperature from an actual temperature of the electrical machine is generated when a predefined number of ascertained differences each exceed the limiting value within a predefined time interval.

The error information can then be output by a control unit carrying out the method according to the invention to a user of the electrical machine and/or transmitted to a further control device. The error information can then be used and/or taken into consideration when operating the electrical machine or when operating a motor vehicle comprising the electrical machine. For example, due to the error information, a warning can be output and/or the setpoint variable can be reduced in order to prevent the electrical machine from heating up further.

According to the invention it can be provided that a permanently excited synchronous machine, a separately excited synchronous machine, or an asynchronous machine is used as the electrical machine. The method can be carried out in various types of electrical machines, wherein the machine model used in each case can be adapted accordingly to the type of the electrical machine used.

For a motor vehicle according to the invention, it is provided that it comprises at least one electrical machine, a control unit, and a regulation, by which a manipulated variable relating to the electrical machine is ascertainable as a function of a setpoint variable, wherein the control unit is configured to carry out a method according to one of the preceding claims.

According to the invention, it can be provided that the electrical machine is a traction electric motor of the motor vehicle and/or that the electrical machine is coupled to a cooling device, in particular a coolant circuit, of the motor vehicle.

All of the advantages and embodiments described above in reference to the method according to the invention also apply similarly to the motor vehicle according to the invention. Correspondingly, all of the advantages and embodiments described in reference to the motor vehicle according to the invention also apply to the method according to the invention.

BRIEF DESCRIPTION OF THE FIGURES

Further advantages and details of the present invention result from the exemplary embodiments described below and on the basis of the drawings. In the figures.

DETAILED DESCRIPTION

Figure 1:
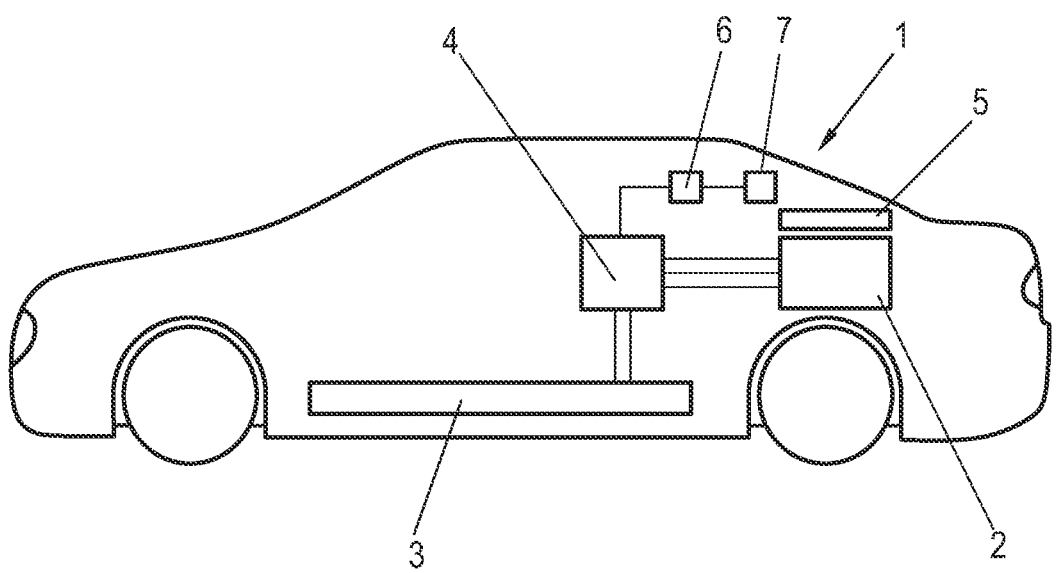
FIG. 1 shows a schematic illustration of a motor vehicle according to the invention.

FIG. 1 shows an exemplary embodiment of a motor vehicle 1. The motor vehicle 1 comprises an electric machine 2 as a traction electric motor. The motor vehicle 1 furthermore comprises an electrical energy storage device 3, which is connected to the electrical machine 2 via power electronics 4. The power electronics 4 can convert a direct current taken from the energy storage device 3 into an alternating current for energizing the electrical machine 2. The energy storage device 3 can be designed as a traction battery of the motor vehicle 1, for example.

The power electronics 4 can generate an alternating current for energizing, for example, a stator winding of the electrical machine 2. Due to the stator current generated by the power electronics 4 in the electrical machine 2, the electrical machine 2 can heat up during operation. The electrical machine 2 is therefore coupled to a cooling device 5 of the motor vehicle 1, wherein the heat generated in the electrical machine 2 can be dissipated via the cooling device 5. The cooling device 5 is only shown schematically in the present case and, in addition to the electrical machine 2, can also in particular cool further components of the motor vehicle 1, for example the energy storage device 3 and/or the power electronics 4.

The motor vehicle 1 furthermore comprises a regulating unit 6, which is configured to regulate the electrical machine 2. The regulating unit 6 generates a manipulated variable relating to the electrical machine 2 as a function of a predefined setpoint variable. For example, the regulating unit 6 can generate a control voltage as a manipulated variable as a function of a setpoint current. The control voltage can be, for example, a three-phase AC voltage, so that a three-phase stator winding of the electrical machine 2 can be energized. The setpoint current can be ascertained, for example, by a motor control device (not shown) of the motor vehicle 2 and transmitted to the regulating unit 6.

The motor vehicle 1 furthermore comprises a control unit 7 which determines a model temperature of the electrical machine 2 by means of a temperature model of the electrical machine 2 stored in the control unit 7. A model of a thermal network, which comprises the electrical machine 2 and the cooling device 5, can be used as the temperature model.

The temperature model makes it possible to model a temperature of the electrical machine 2 as a function of various operating parameters of the motor vehicle 1, in particular operating parameters of the electrical machine 2, the energy storage device 3, and/or the power electronics 4. The temperature of the electrical machine 2 can be, for example, a winding temperature of the stator winding of the electrical machine 2 to which a control voltage is applied by the power electronics 4 as specified by the regulating unit 6.

To ascertain the model temperature, the temperature model can also take into consideration operating parameters of the cooling system 5 in addition to operating parameters of the electrical machine 2, such as a stator current, a current in an excitation winding, a torque of the electrical machine, and/or a speed of the electrical machine. Furthermore, the operating time of the electrical machine 2 or the power converted in each case in the electrical machine 2 during the operating time can also be taken into consideration, since these have a significant influence on the heat generation in the electrical machine 2 and thus also on its temperature. By describing the thermal network, which comprises at least the electrical machine 2 and the cooling device 5, the heat generation in the electrical machine and the heat flows to and from the electrical machine 2, in particular into the cooling system 5, can be calculated and used to ascertain the model temperature.

For this purpose, the temperature model can comprise one or more computing rules, which can be stored in the control unit 7, for example. The operating parameters of the electrical machine 2, the cooling system 5, and/or further components such as the energy storage device 3 or the power electronics 4 required to calculate the model temperature can be transmitted to the control unit 7 by the respective components and/or by control devices connected to the components. In order to check the correctness of the model temperature ascertained by means of the temperature model, the control unit 7 is also configured to carry out a method for checking the model temperature of the electrical machine 2 ascertained by means of the temperature model.

For this purpose, the control device 7 ascertains a model value of the manipulated variable using a machine model comprising at least one temperature-dependent parameter as a function of the setpoint variable of the regulation implemented by the regulating unit 6 and the model temperature ascertained from the temperature model. The respective present setpoint value which is used by the control device 6 can for this purpose be transmitted from the regulating unit 6 or the motor control device of the motor vehicle 2 to the control unit 7. Furthermore, the regulating unit 6 transmits the manipulated variable generated in each case as a function of the setpoint variable to the control unit 7. It is possible for the regulating unit 6 and the control unit 7 to be implemented in a common control device.

Furthermore, the control unit 7 is configured to ascertain a difference between the actual manipulated variable of the regulation and the model value of the manipulated variable, wherein the difference is compared to a limiting value. When the limiting value is exceeded, the control device 7 detects a deviation of the model temperature from the actual temperature of the electrical machine 2.

Additionally or alternatively thereto, the control device 7 can be configured to determine a derived, further variable from the actual manipulated variable and the model value of the manipulated variable, wherein a difference between the further variable derived from the actual manipulated variable of the regulation and the corresponding further variable derived from the model value of the manipulated variable is compared to a limiting value, wherein a deviation of the model temperature from an actual temperature of the electrical machine is detected when the limiting value is exceeded.

The control device 7 uses the effect that, due to the regulation, a temperature of the electrical machine 2, for example a winding temperature, is included in the ascertainment of the manipulated variable. By comparing the model value of the manipulated variable, which results from the model temperature to be checked, to the actual manipulated variable, it can be ascertained whether the model temperature at least substantially corresponds to the actual temperature or whether there is a deviation between the model value of the manipulated variable and the actual manipulated variable exceeding the limiting value.

In this way, it is possible to check the model temperature without measuring the temperature in the electrical machine 2. The functioning of the cooling device 5 can advantageously also be checked by checking the model temperature, since in the case of inadequate cooling of the electrical machine 2 by the cooling device 5, for example as a result of a failure of a coolant pump and/or clogging of a coolant channel in the cooling device 5 and/or in the electrical machine 2, heating occurs in the electrical machine 2 which exceeds the temperature ascertained from the temperature model based on the correct functioning of the cooling circuit 5.

Figure 2:
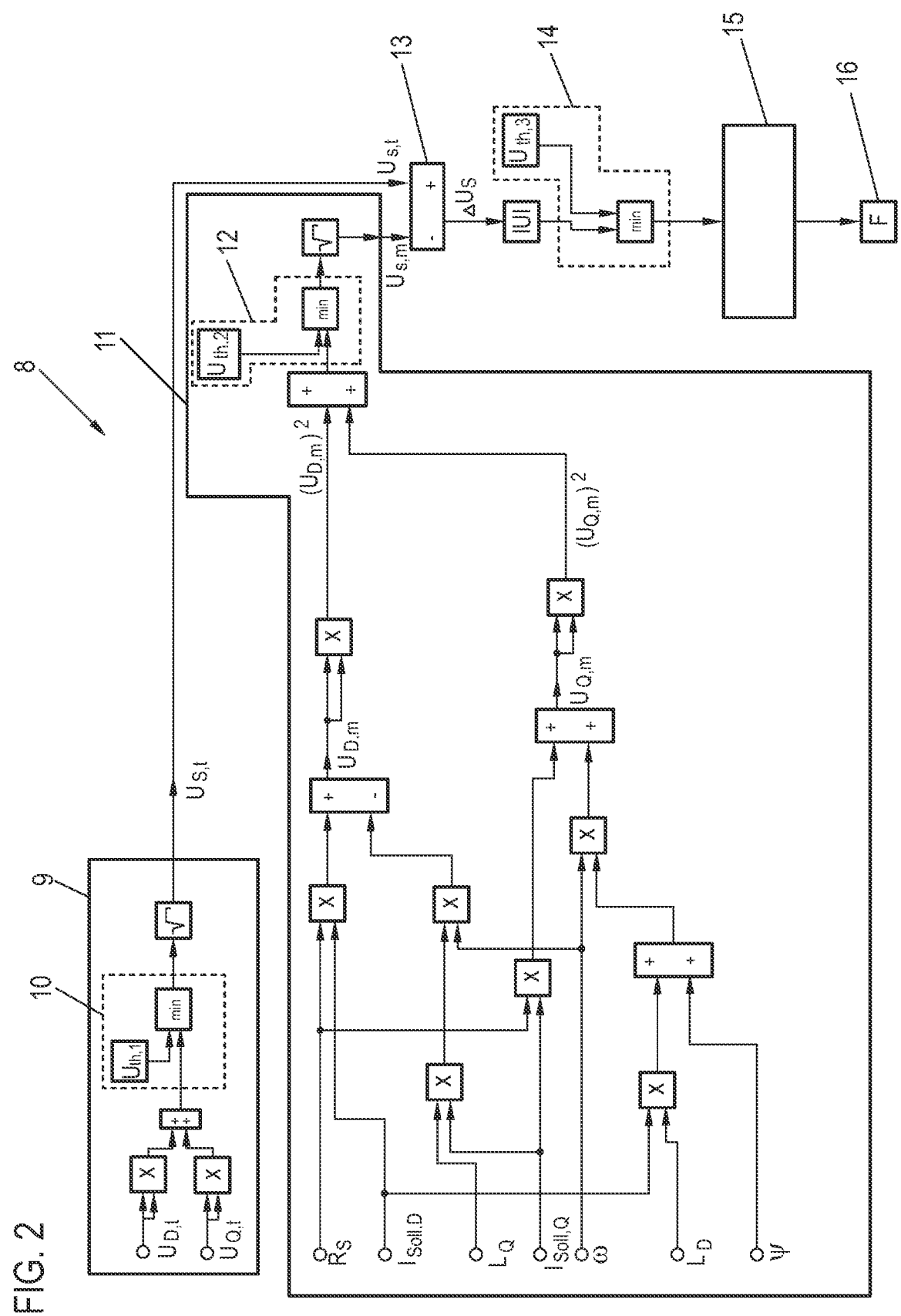
FIG. 2 shows a first block diagram to illustrate a first exemplary embodiment of a method according to the invention.

FIG. 2 shows an exemplary embodiment of the method carried out by the control unit 7 for checking the model temperature of the electrical machine 2. In this exemplary embodiment, the electrical machine 2 is designed as a permanently excited synchronous machine.

A three-phase stator winding of the permanently excited synchronous machine is energized by the regulating unit 6 within the scope of a current regulation, wherein the current regulation taking place as a field-oriented regulation. The regulating unit 6 ascertains a three-phase winding voltage for the stator winding of the electrical machine 2 as a function of a predetermined setpoint current.

This is described in the context of the field-oriented regulation by the voltages $U_D$ and $U_Q$.

In the block diagram 8 of the method carried out by the control unit 7 shown in FIG. 2, the actual manipulated variables $U_{D,t}$ and $U_{Q,t}$ represent the input of section 9 in which an actual phase voltage $U_{S,t}$ is ascertained from the manipulated variables $U_{D,t}$ and $U_{Q,t}$ according to $$U_{S,t} = \sqrt{(U_{D,t})^2 + (U_{Q,t})^2} \qquad (1)$$

Furthermore, in the illustrated part 10 of section 9, a limiting value comparison to a first limiting value $U_{th,1}$ is carried out in order to avoid the ascertainment of the phase voltage $U_{S,t}$ at very low voltages. This limiting value comparison can also be carried out at another point in section 9, for example after calculating the root and/or before squaring of the manipulated variables $U_{D,t}$ and $U_{Q,t}$, wherein the absolute value of the limiting value $U_{th,1}$ can be adjusted accordingly.

In a further section 11 of the block diagram 8, a machine model of the electrical machine 2 designed as a permanently excited synchronous machine is shown. Input variables of the machine model are represented by the resistance of the stator winding $R_S$, the longitudinal component of the setpoint current $I_{soll,D}$, the transverse component of the setpoint current $I_{soll,Q}$, the longitudinal inductance $L_D$ of the electrical machine 2, the transverse inductance $L_Q$ of the electrical machine 2, the electrical circular frequency $\omega$ of the stator variables in the electrical machine 2, and the magnetic flux $\Psi$ in the electrical machine. The stator resistance $R_S$ represents a temperature-dependent parameter of the electrical machine 2 or of the stator winding energized via the regulating unit 6. The magnetic flux $\Psi$, which is generated by the permanent magnets of a rotor of the electrical machine, can also be used as a temperature-dependent parameter.

Model values $U_{D,m}$ and $U_{Q,m}$ of the manipulated variables $U_{D,t}$ and $U_{Q,t}$ are calculated from the input variables of the machine model. As shown in block diagram 8, this is done via the formulas $$U_{D,m} = R_S \cdot I_{soll,D} - \omega \cdot L_Q \cdot I_{soll,Q} \qquad (2)$$

and $$U_{Q,m} = R_S \cdot I_{soll,Q} - \omega \cdot L_D \cdot I_{soll,D} + \omega \cdot \psi \qquad (3).$$

A model value of the phase voltage $U_{S,m}$ is calculated from each of the modeled manipulated variables $U_{D,m}$ and $U_{Q,m}$ as a derived variable. The calculation is carried out analogously to the calculation of the actual phase voltage $U_{S,t}$ in section 9. Analogous to the limiting value comparison in section 10, a limiting value comparison of the ascertained, derived variable to a second limiting value $U_{th,2}$ is also carried out in section 12.

In block 13, a difference $\Delta U_s$ is formed from the actual phase voltage $U_{S,t}$ and the model value of the phase voltage $U_{S,m}$. In section 14, the absolute value of the difference $\Delta U_s$ is then compared to a third limiting value $U_{th,3}$. If the limiting value $U_{th,3}$ is exceeded, corresponding information is relayed to block 15.

In block 15, the frequency with which the limiting values are exceeded in section 14 is counted for the duration of a predetermined time period. During this time period, the actual phase voltage $U_{S,t}$ and the modeled phase voltage $U_{S,m}$ are continuously ascertained, the difference $\Delta U_s$ is determined and compared to the limiting value $U_{th,3}$. If a predetermined frequency of exceeding the limiting values has been determined within the predetermined time period, error information is generated by the control unit 7 in block 16.

The error information describes a deviation of the actual temperature of the electrical machine 2 from the model temperature ascertained by means of the temperature model. For example, if the error information is present, the regulation of the electrical machine 2 can be adapted by the regulating unit 6. It is also possible for the error information to be transmitted to further control units of the motor vehicle 1 which, for example, output a warning to a driver and/or change further operating parameters of the motor vehicle 1, in particular in order to prevent progressive heating of the electrical machine 2 and/or to effectuate a decrease in the temperature of the electrical machine 2.

Figure 3:
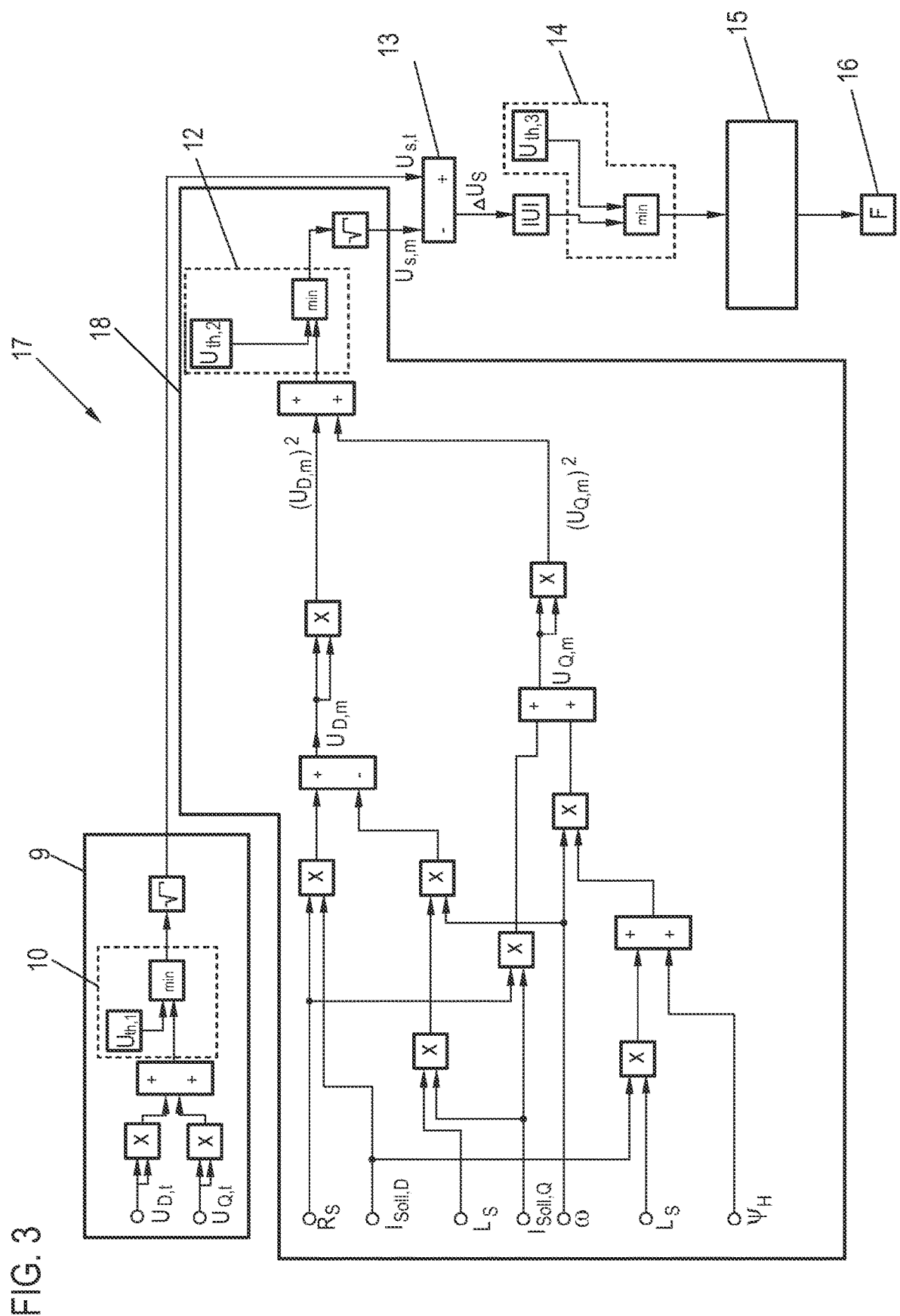
FIG. 3 shows a second block diagram to illustrate a second exemplary embodiment of a method according to the invention.

In FIG. 3, a second exemplary embodiment of a method carried out by the control device 7 is shown in a further block diagram 17. In this exemplary embodiment, the electrical machine 2 is designed as an asynchronous machine. Analogously to the first exemplary embodiment, the regulating unit 2 generates a stator voltage in a field-oriented regulation as a function of a predefined setpoint current, which is applied to a three-phase stator winding of the asynchronous machine. Analogously to the first exemplary embodiment, the actual phase voltage $U_{S,t}$ is ascertained in blocks 9 and 10 from the manipulated variables $U_{D,t}$ and $U_{Q,t}$ ascertained by the regulating unit 6.

In a section 18 of the block diagram 17, a machine model corresponding to the design of the electrical machine 2 as an asynchronous machine is shown. The input variables of the model represent the resistance of the stator winding $R_S$, the longitudinal component of the setpoint current $I_{soll,D}$, the transverse component of the setpoint current $I_{soll,Q}$, the electrical frequency $\omega$ of the circulation of the currents in the stator of the electrical machine 2, the main flux $\Psi_H$ as well as the leakage inductance $L_S$ of the asynchronous machine.

From these input variables, according to the formulas $$U_{D,m} = R_S \cdot I_{soll,D} - \omega \cdot L_S \cdot I_{soll,Q} \quad (4)$$

and $$U_{Q,m} = R_S \cdot I_{soll,Q} - \omega \cdot L_S \cdot I_{soll,D} + \omega \cdot \psi_H \quad (5)$$

a model value $U_{D,m}$ of the manipulated variable $U_D$ and a model value $U_{Q,m}$ of the manipulated variable $U_Q$ are ascertained. The temperature-dependent stator winding $R_S$ and/or the temperature-dependent magnetic flux $\Psi_H$ are used as temperature-dependent parameters in the machine model.

Analogously to the explanations in the first exemplary embodiment, a model value of the phase voltage $U_{S,m}$ is ascertained from these model values of the manipulated variables as a derived, further variable. The difference $\Delta U_s$ is ascertained from the model value $U_{S,m}$ of the phase voltage and from the actual phase voltage $U_{S,t}$ analogously to the first exemplary embodiment. Corresponding to the explanations of the first exemplary embodiment, a limiting value comparison to a second limiting value $U_{th,2}$ then takes place in section 14 and, in blocks 15 and 16, the counting of times the limiting value is exceeded and the generation of the error information.

In addition to the two exemplary embodiments shown, further exemplary embodiments of the method according to the invention are also possible in which corresponding model values $U_{D,m}$ and $U_{Q,m}$ are ascertained in accordance with other rules that correspond to the model of the electrical machine 2. The electrical machine can also be designed, for example, as a separately excited synchronous machine. In addition to considering a manipulated variable acting on a stator winding of the electrical machine 2, the method can also be used, for example, when energizing a rotor winding of an electrical machine 2, wherein the voltage drop across the rotor winding is accordingly considered as the control voltage, for which a model value is ascertainable by means of a corresponding model.

The values for the limiting values $U_{TH1}$, $U_{TH2}$, and $U_{TH3}$ used in each case can also be selected in dependence on the type and/or the design of the electrical machine 2 and can be adapted accordingly to the electrical machine 2 used. The input variables of the machine models dependent on the machine type can, for example, each be determined by measurement and stored in the control unit 7 as parameters or temperature-dependent characteristic curves or parameter fields.

The invention claimed is:

1. A method for checking a model temperature of an electrical machine ascertained by a temperature model, comprising:
   specifying, as part of a regulation of the electrical machine, at least one manipulated variable as a function of a setpoint variable, the at least one manipulated variable relating to the electrical machine,
   ascertaining a model value of the manipulated variable based on a function of the manipulated variable and the model temperature, wherein the model temperature is obtained from a machine model comprising at least one temperature-dependent parameter,
   ascertaining a difference between an actual value of the manipulated variable and the model value of the manipulated variable and/or a difference between a variable derived from the actual value of the manipulated variable and a corresponding further variable derived from the model value of the manipulated variable, and
   detecting a deviation of the model temperature from an actual temperature of the electrical machine,
   wherein the deviation of the model temperature is detected by comparing the difference against a limiting value and, if the limiting value is exceeded, the deviation of the model temperature is determined to be present.

2. The method as claimed in claim 1, wherein a setpoint current is used as the setpoint variable and/or in that a control voltage is used as the manipulated variable.

3. The method as claimed in claim 1, wherein the at least one manipulated variable acts on at least one of a stator winding and a rotor winding of the electrical machine.

4. The method as claimed in claim 3, wherein the variable derived from the actual value of the manipulated variable or the corresponding further variable derived from the model value of the manipulated variable is a phase voltage of the stator and/or rotor winding.

5. The method as claimed in claim 1, wherein the regulation takes place by means of a field-oriented regulation and/or in that at least one variable corresponding to the manipulated variable of the field-oriented regulation is ascertained by means of the machine model.

6. The method as claimed in claim 1, wherein a model of a thermal network, which comprises the electrical machine and at least one cooling device, is used as the temperature model.

7. The method as claimed in claim 1, wherein a winding resistance and/or a temperature-dependent magnetic flux is used as the temperature-dependent parameter of the machine model.

8. The method as claimed in claim 1, wherein the step of detecting the deviation is only carried out if the manipulated variable and/or the model value of the manipulated variable exceed a second limiting value.

9. The method as claimed in claim 1, wherein the manipulated variable of the regulation, the model value of the manipulated variable from the machine model, and the difference are continuously ascertained during the operation of the electrical machine at different times,
  wherein an item of error information which describes a deviation of the model temperature from an actual temperature of the electrical machine is generated when a predefined number of ascertained differences each exceed the limiting value within a predefined time interval, and
  wherein the predefined number of ascertained differences is at least two.

10. The method as claimed in claim 1, wherein a permanently excited synchronous machine, a separately excited synchronous machine, or an asynchronous machine is used as the electrical machine.

11. A motor vehicle comprising:
  at least one electrical machine, and
  a control unit which is configured to carry out the method as claimed in claim 1.

12. The motor vehicle as claimed in claim 11, wherein the electrical machine is a traction electric motor of the motor vehicle and/or in that the electrical machine is coupled to a coolant circuit of the motor vehicle.

13. The method as claimed in claim 1, wherein a setpoint current is used as the setpoint variable and a control voltage is used as the manipulated variable.

\* \* \* \* \*